United States Patent [19]

Busse et al.

[11] 3,915,863

[45] Oct. 28, 1975

[54] APPARATUS FOR SHIFTING, LOCKING AND UNLOCKING FILTER PLATES IN A PRESSURE FILTER

[75] Inventors: Oswald Busse; Hugo Klesper; Werner Junker, all of Aarbergen, Germany

[73] Assignee: Passavant-Werke Michelbacher Hutte, Germany

[22] Filed: Aug. 29, 1974

[21] Appl. No.: 493,270

[30] Foreign Application Priority Data
Aug. 6, 1973 Germany............................ 2339770
Aug. 6, 1973 Germany............................ 2420708

[52] U.S. Cl. .............................................. 210/230
[51] Int. Cl.² .......................................... B01D 25/12
[58] Field of Search ........... 210/224, 230, 231, 236, 210/160; 198/20 R, 59, 89, 102, 106, 111, 162, 189, 203, 220 CG, 225, 160

[56] References Cited
UNITED STATES PATENTS

| | | | |
|---|---|---|---|
| 1,689,556 | 10/1928 | Nichols............................ | 198/189 X |
| 2,530,786 | 11/1950 | Rose .................................... | 198/203 |
| 2,871,012 | 1/1959 | Price.............................. | 198/162 X |
| 3,207,315 | 9/1965 | Kurita............................. | 210/236 X |
| 3,232,435 | 2/1966 | Lismer........................... | 210/236 X |
| 3,306,455 | 2/1967 | Lismer........................... | 210/236 X |
| 3,360,130 | 12/1967 | Kaga............................... | 210/236 X |
| 3,563,386 | 2/1971 | Kurita............................... | 210/236 |
| 3,567,027 | 3/1971 | Kurita............................... | 210/236 |
| 3,765,458 | 10/1973 | Ziegler et al...................... | 198/189 |
| 3,802,565 | 4/1974 | Hughes et al. ...................... | 210/160 |

*Primary Examiner*—Theodore A. Granger

[57] ABSTRACT

Apparatus for shifting, locking and unlocking filter plates in a pressure filter having filter plates mounted for horizontal shifting movement by a driven shifting unit. A pawl-like member engages catch elements on the filter plates and at least one resilient, yielding member is associated with the means for transmitting power from the driven shifting unit to the filter plates.

13 Claims, 13 Drawing Figures

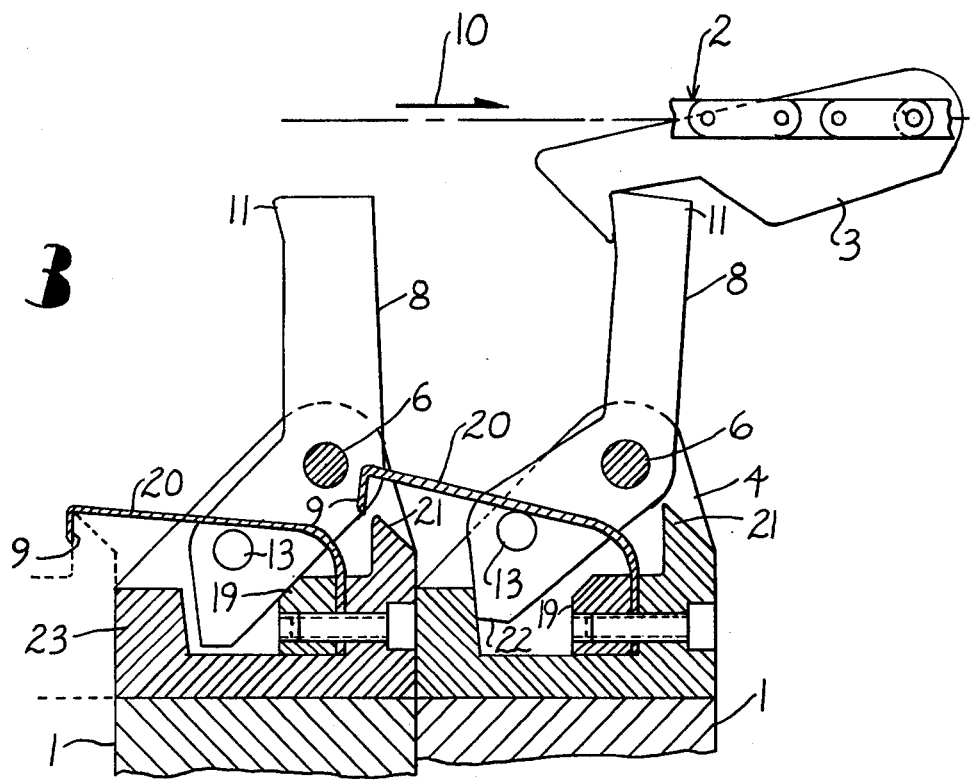
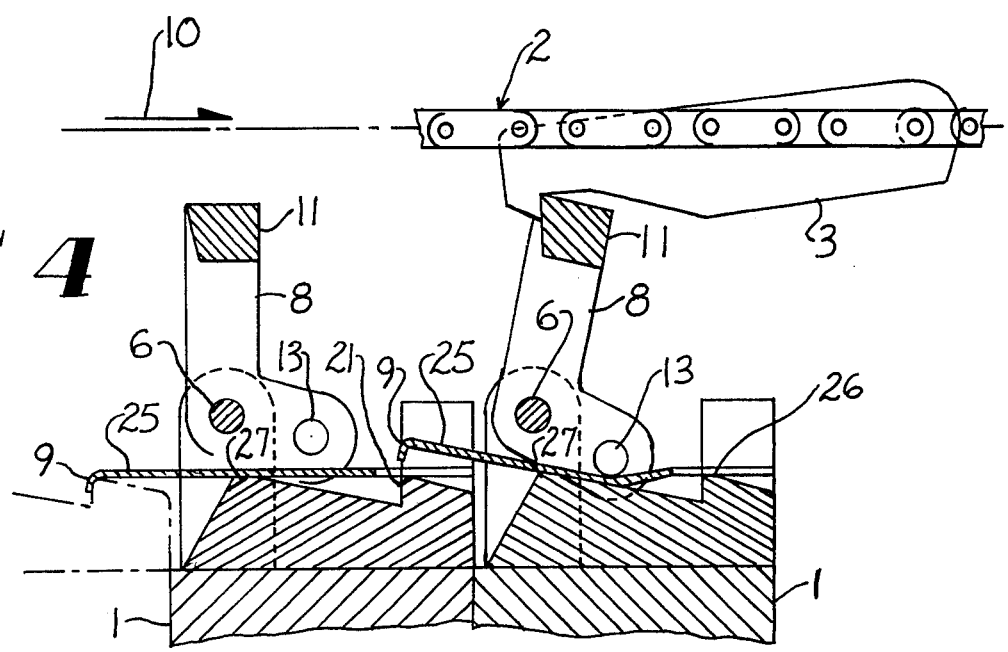

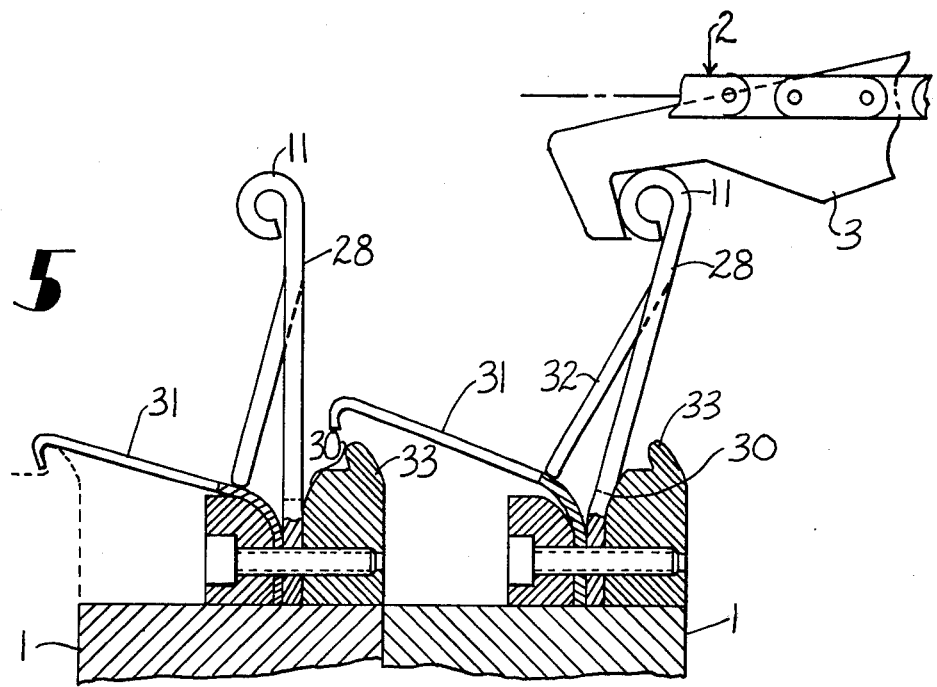
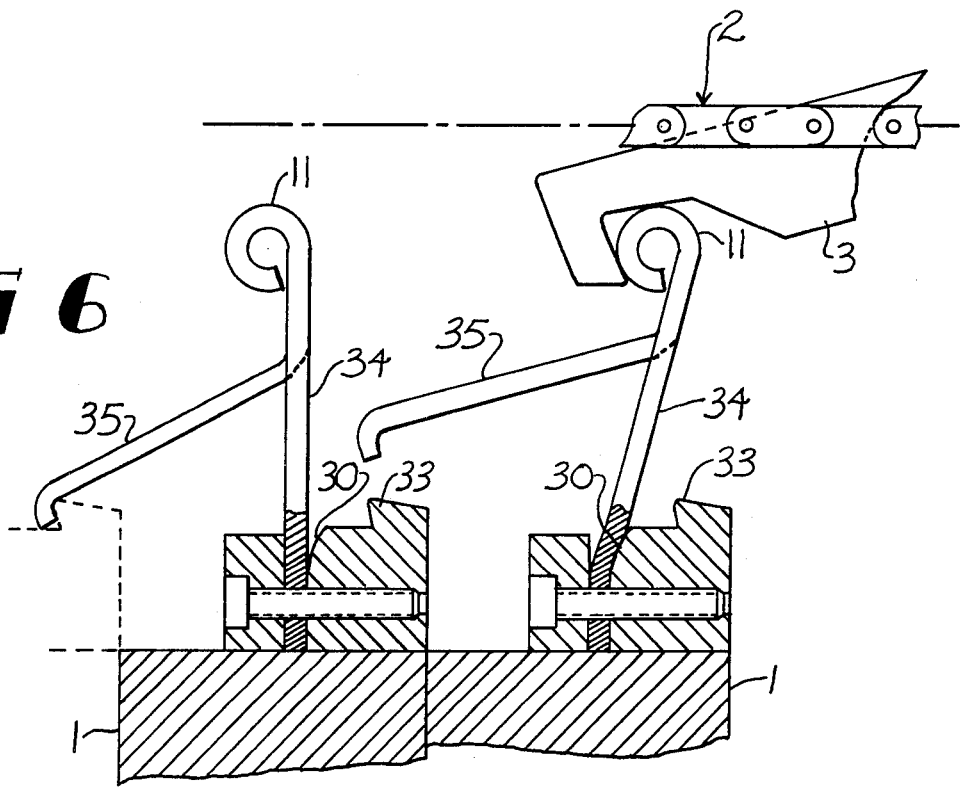

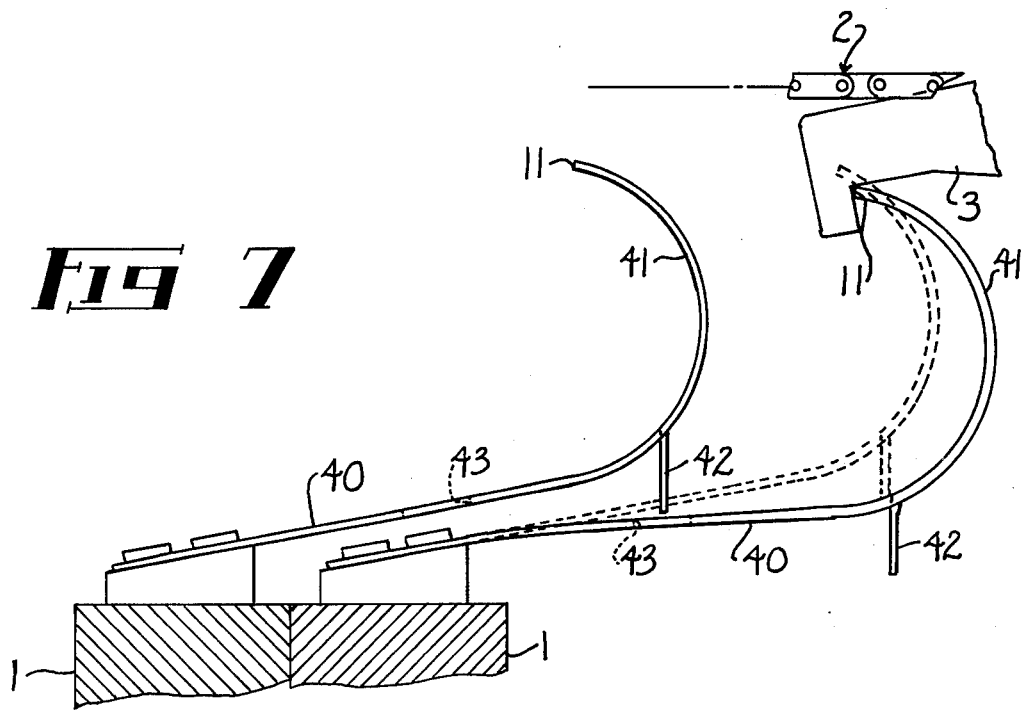
Fig 7
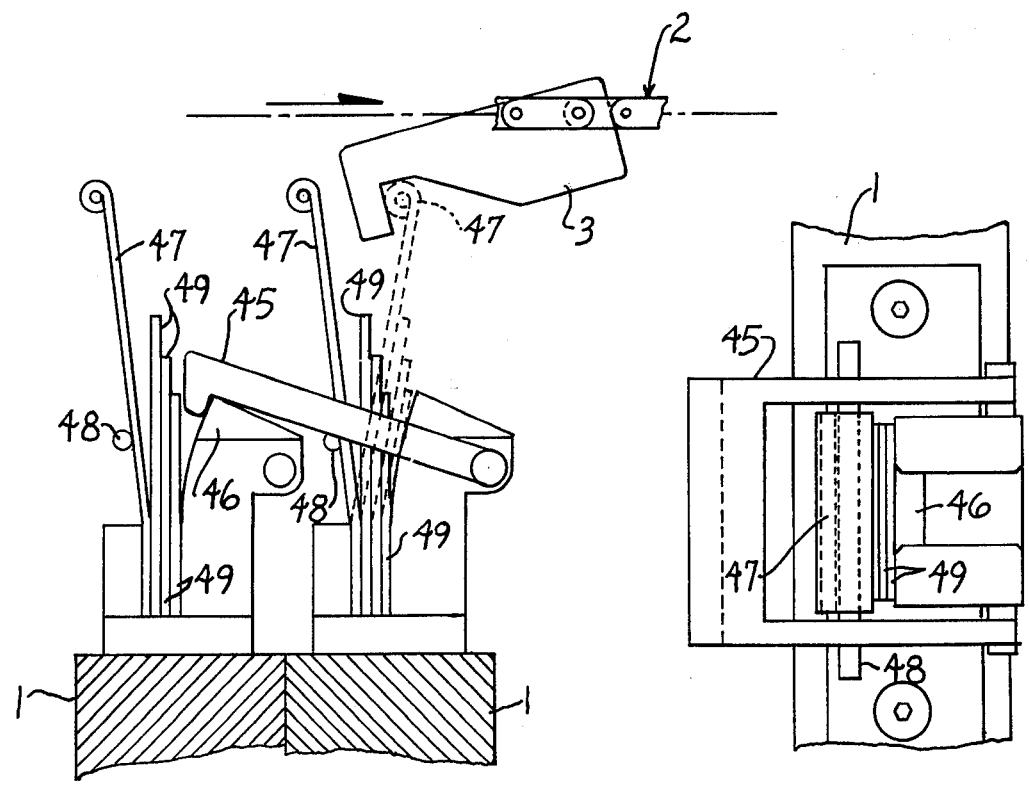
Fig 8
Fig 9

1

APPARATUS FOR SHIFTING, LOCKING AND UNLOCKING FILTER PLATES IN A PRESSURE FILTER

BACKGROUND OF THE INVENTION

This invention relates to apparatus for shifting filter plates, which are mounted for movement along horizontal guide members and includes driven shifting means which is movable along the guide members in the direction of shifting and is provided with at least one engaging means which contacts a catch that is preferably mounted on each filter plate. Such apparatus is disclosed in German Pat. Nos. 1,144,689 and 1,288,073. According to the disclosure in these patents, the engaging means is in the form of a pawl mounted on an endless chain and having a hooked end which engages a fixed catch mounted on the filter plate to be moved. Guide surfaces provided on the pawl and catch insure that the pawl will engage only the frontmost plate in a stack of filter plates. When such a pawl on its endless chain snaps into place behind the catch, the filter plate is shifted abruptly since extremely high accelerative forces are transmitted suddenly. Accordingly, the drive means for the chain must be particularly strong. Also, the chain, pawl and catch with their respective bearing and engaging parts are subjected to considerable stress. Furthermore, operation of such apparatus is extremely noisy.

SUMMARY OF THE INVENTION

It is an object of our present invention to improve the aforementioned apparatus by relatively simple means which insures a smoother, steadier, and jolt-free operation. In accordance with our invention, this is achieved by providing at least one flexible yielding member, such as a spring member, in the transmission system between a driven shifting unit and the filter plate being shifted. The flexible, yielding member permits the speed at which the filter plate is moved to be gradually increased until it finally reaches the speed of the driven shifting unit. This is accomplished by placing the flexible yielding member under tension. The flexible, yielding member may be in various forms and have various configurations, such as a resilient member, a flexible or slip coupling associated with the drive unit, or a flexible bearing means for the drive chain. It is, however, preferable to arrange the flexible yielding member adjacent the filter plate in the area of engagement between the engaging means carried by the driven shifting unit and catch means carried by the filter plate. In this area the flexible yielding member not only enables the filter plate to progressively increase acceleration but also eases the engagement of the connecting parts whereby the apparatus is less noisy.

The parts of the connecting means, such as a pawl itself and/or a catch means and/or a stop member associated with the latter are constructed and assembled to be flexibly yielding. The yielding ability should be such as to enable the flexible yielding member, after sufficient elongation, to transmit the accelerative force to the filter plate. If, on the other hand, shifting is required to be particularly smooth, the flexible yielding member, such as a spring, is constructed and assembled to be extremely yielding and should be associated with stop means to limit its spring elongation.

In a preferred embodiment of the invention, the apparatus also comprises locking and unlocking means for adjacent filter plates, with the locking means consisting of a locking member attached to each filter plate and engaging a stop member attached to an adjacent filter plate and with each of the locking members being associated with releasing means that cooperate with pawl means in unlocking the locking member. Also, the locking member may be in the form of a double lever, one arm of which serves as the releasing means cooperating with pawl means while the latter engages a catch member.

It is important that the locking means linking the frontmost plate with the following plate be released promptly before the plate is shifted by the pawl means. Our invention permits smooth and safe operation and proper timing of the unlocking procedure with relation to the acceleration. Also, the apparatus is simplified by the fact that the pawl means is also the releasing member which cooperates with the locking member and that the flexible yielding member is inserted in the apparatus transmitting motive power from the pawl by means of the catch member to the locking member to be lifted. Our apparatus provides for a catch member which has a certain degree of mobility to unlock the locking member but which is then limited in its movement by a stop, thus transmitting the motive power from the pawl to the filter plate. According to our invention, the flexible yielding member may be associated with the parts of the apparatus in various ways. For example, it may be associated with the locking bar and/or the pawl means and/or the stop means may have the form and the function of a flexible yielding member such as a spring.

In a particularly simple embodiment of our invention, the conventional pivot bearings can be dispensed with. In this embodiment the locking member is a leaf spring and the catch means cooperating with the pawl is integral with the leaf spring.

DESCRIPTION OF THE DRAWINGS

Apparatus embodying features of our invention is illustrated in the accompanying drawings forming a part of this application, wherein all drawings, with the exception of FIG. 1A, show only the upper ends of the filter plates with the shifting and locking means arranged thereon.

FIGS. 3 and 4 are fragmental sectional views showing embodiments wherein the locking member is a leaf spring and the catch means is a pivotally mounted lever;

FIG. 5 is a fragmental sectional view showing another embodiment wherein the locking member and the catch means are two separate leaf springs;

FIGS. 6 and 7 are fragmental sectional views showing different embodiments wherein the locking member and the catch means are integral parts of a common leaf spring;

FIG. 8 is a fragmental sectional view showing another embodiment wherein the locking member is a pivoted lever in the form of a yoke and the catch means is a leaf spring carrying a cam that engages the locking member;

FIG. 9 is a top plan view of the embodiment shown in FIG. 8;

DETAILED DESCRIPTION

Figure 1:
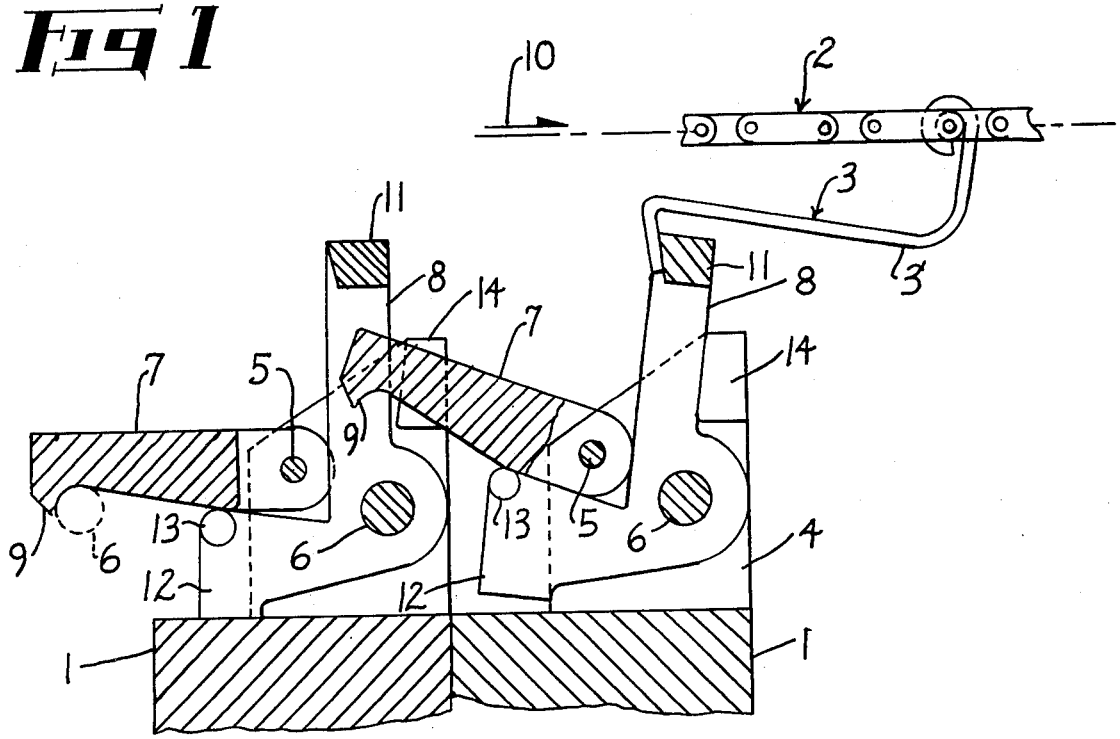
FIG. 1 is a fragmental, sectional view showing the locking member and the catch means as being two separate pivotally mounted levers.
Figure 1A:
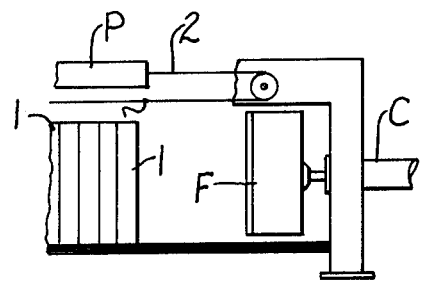
FIG. 1A is a diagrammatic view of a portion of the pressure filter showing the general arrangement of the filter plates, the follower and the means for actuating the follower and the shifting unit for the filter plates.

Referring to FIGS. 1 and 1A of the drawings we show the upper ends of a plurality of filter plates 1 which are adjacent each other when the filter is closed, as shown in FIG. 1A. These plates must be pulled apart and shifted single to the right side, as viewed in the drawing, so that the filter cake may drop out of the pressure filter. To permit shifting, each filter plate is movable along and supported by conventional supporting means, such as horizontally disposed guide rails. The filter plates 1 are compressed by a follower F which is actuated by a power unit, such as hydraulic cylinder C. In view of the fact that such supporting means for filter plates and the means for actuating the follower are well known in the art to which our invention relates no further description thereof is deemed necessary. The filter plates are moved in the direction of shifting by an endless driven shifting unit 2, such as a chain or cable, which is moved by a suitable power unit P in a plane above the filter plates and in parallel relation to the supporting guide means.

The driven shifting unit 2 is shown as being a chain which is provided with one or several engaging elements, such as pawls 3. Also, the driven shifting unit 2 may have a flexible or slip coupling or the chain itself may have resilient bearings and joints. In the embodiment shown in FIG. 1, the pawl 3 itself is a resilient, flexible yielding member in the form of a leaf spring which may have a plastic coating for noise attentuation.

Each filter plate 1 has a bracket 4 to which are attached levers 7 and 8 by means of pins 5 and 6, respectively. Lever 7 is a locking member and the other lever 8 is a catch member. The lever 7 is provided with a hooked end 9 which engages the pin 6 carried by the adjacent successive filter plate 1 while in the locked position. The lever 8 has an upstanding arm with a catch element 11 at the upper end thereof which is engaged by the pawl 3. The lever 8 has another arm 12 which extends in a generally horizontal plane and carries a pin or cam 13 located below the locking member 7. A stop 14 is carried by each bracket 4 and limits movement of the lever 8 in a clockwise direction, as viewed in FIG. 1.

The pawl 3, which is moved in the direction indicated by arrow 10, has a deflecting surface 3' on its under side which rides over the upper end of the lever 8 and its catch element 11 so as to prevent the pawl 3 from dropping into place before it has reached the forwardmost filter plate 1 in a stack of plates. The pawl 3 then drops into place and engages the catch element 11 and rotates the lever 8 in a clockwise direction, as viewed in FIG. 1, so that the pin 13 engages the lever 7 and moves it upwardly whereby it is disengaged from the stop or pin 6 of the adjacent successive filter plate 1. The lever 8 then comes to rest against the stop 14 whereupon movement of the pawl 3 is transferred to the filter plate 1. The adjacent filter plate 1 is not moved due to the fact that its locking member 7 is still in engagement with the pin 6 of the adjacent successive filter plate on the left, as shown in FIG. 1. Any shocks or sudden acceleration occurring during this operation will be compensated for by the flexible yielding pawl 3.

Throughout the specification and drawings the parts identical to, or similar to, the parts shown in FIG. 1 have identical reference numerals.

In the embodiment shown in FIG. 2 and in all modifications described hereinafter, the pawl 3 is not a flexible resilient element but a rigid, pivoted member. The locking lever 7 is springloaded whereby it is urged in a counterclockwise direction, as viewed in FIG. 2, by means of a leaf spring 15 attached to bracket 4. The leaf spring 15 is also provided with a portion 16 which engages the lever 8 to serve as s stop therefor. An additional rigid stop 17 is carried by the bracket 4 in position for lever 8 to engage upon rotation of lever 8 away from stop portion 16. The horizontal arm 12 of the lever 8 as shown in FIG. 1 is omitted in the embodiment shown in FIG. 2. Instead, a cam 13 engaging the under side of the locking lever 7 is carried by the upstanding lever 8 in position to engage an inclined portion 18 on the under surface of the lever 7. The hooked end 9 of the lever 7 is engaged by the pin 5 of the lever 7 of the adjacent successive filter plate 1.

Figure 2:
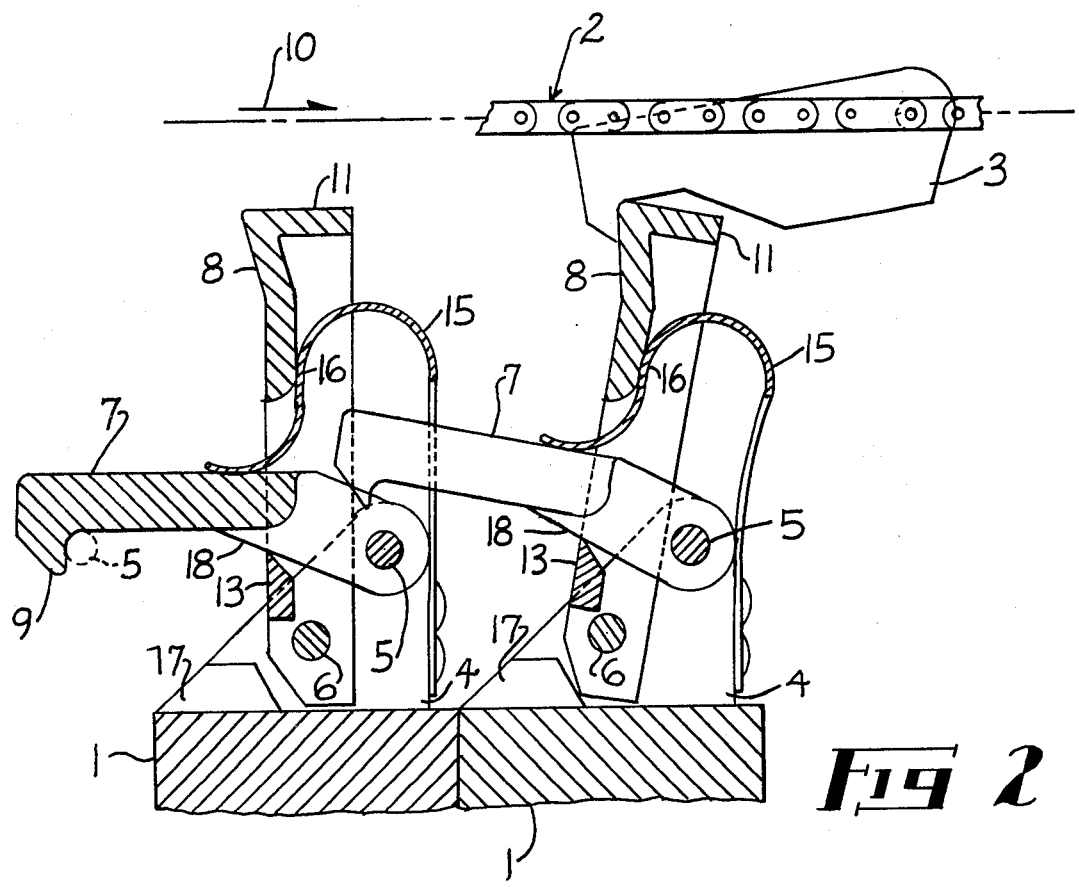
FIG. 2 is a fragmental, sectional view also showing the locking member and the catch means as being separate pivotally mounted levers and is a modification of the apparatus shown in FIG. 1.

In the embodiment shown in FIG. 3, the lever 7 of the embodiments shown in FIG. 1 and 2 is replaced by a bent leaf spring 20 one end of which is secured to the bracket 4 by a retainer member 19, with its free end being bent in the form of a hook 9. The leaf spring 20 is retained in locked position by its spring load and engages a catch 21 carried by the adjacent successive filter plate 1. The spring 20 is lifted off the catch 21 against its spring tension by means of a cam 13 carried by the lever 8. During this movement, the spring 20 will resist rotation of the lever 8 until the lower end 22 of the lever 8 comes to rest against a rigid stop 23 carried by bracket 4.

In the alternate embodiment shown in FIG. 4, the locking member corresponding to member 7 of FIGS. 1 and 2 is also in the form of a leaf spring 25 one end of which is anchored at 26 to bracket 4. About midway between the anchored end of leaf spring 25 and a bearing surface 27 on bracket 4 the spring 25 is engaged by a cam 13 carried by the lever 8, which depresses the leaf spring 25 thereby forcing the hooked end 9 of the spring upwardly to disengage the catch 21 of the adjacent successive filter plate 1.

All of the embodiments shown in FIGS. 2, 3 and 4 have a common characteristic in that the movement of the lever 8, when being turned, meets with the gradually growing resistance of the respective leaf springs 15, 20 and 25, until the movement of the lever 8 is stopped by the respective stops 17, 23 and 27, so that any shocks are absorbed and the accelerative forces are gradually transmitted to the filter plate 1.

In the embodiment shown in FIG. 5, the lever 8 of the embodiments shown in FIGS. 1–4 is replaced by a substantially vertically disposed leaf spring 28 having a looped upper end 11 which is engaged by the pawl 3. The lower portion of the leaf spring 28 abuts against a curved surface 30 which serves to progressively increase the rigidity of the spring. The locking member is in the form of a second leaf spring 31 of smaller dimensions whose spring action is directed toward open position away from its associated catch 33 which is different from the example shown in FIG. 4. When the leaf spring 28 is in its neutral, vertical position, a downwardly and rearwardly extending portion 32 thereof depresses the spring 31 so that it is forced into engagement with its associated catch 33 carried by the adjacent successive filter plate 1.

In the embodiment shown in FIG. 6, the locking member indicated at 35 and the upstanding leaf spring 34 carrying the catch element 11 are an integral unit. The apparatus shown in FIG. 6 operates in substantially identical manner as that shown in FIG. 5.

In the embodiment shown in FIG. 7, each filter plate 1 carries a leaf spring 40 extending forwardly in the direction of movement and is provided with an upwardly bent end 41 which forms the catch element 11 which is engaged by the pawl 3. Between the upwardly bent end 41 of the leaf spring 40 and its opposite end, which is anchored to the plate 1, there is located a depending locking detent 42. An aperture 43 is also provided in each leaf spring 40 at a location between detent 42 and the filter plate 1 in position to be engaged by the locking detent 42 of the adjacent successive leaf spring 40 when the forwardmost leaf spring 40 is in neutral position, as indicated by a broken line in FIG. 7. When the pawl 3 engages the end portion 41 defining the catch element 11, the leaf spring 40 is bent downwardly thereby releasing the locking detent 42.

In the embodiment shown in FIGS. 8 and 9, the locking member is a pivoted lever in the form of a yoke 45 which by virtue of its weight engages a catch 46 of the adjacent successive filter plate 1. The catch 47 engaged by the pawl 3 is a long and relatively weak leaf spring which carries a cam 48 that engages the under side of the lever 45 and moves it upwardly when the pawl 3 engages and straightens the leaf spring 47 which normally is inclined in a direction opposing the direction of shifting. The leaf spring 47 is thus moved to rest against a stop means formed by a set of vertically arranged leaf springs 49 resulting in a progressive spring action.

Similar to the locking member 45 as shown in FIGS. 8 and 9, all pivoted levers in the embodiments described hereinafter may be in the form of yokes or double levers which are symmetrical about the median plane of the filter press. In all alternate embodiments, the leaf springs may likewise be composed of spring piles so as to have a progressive spring action.

Figure 10:
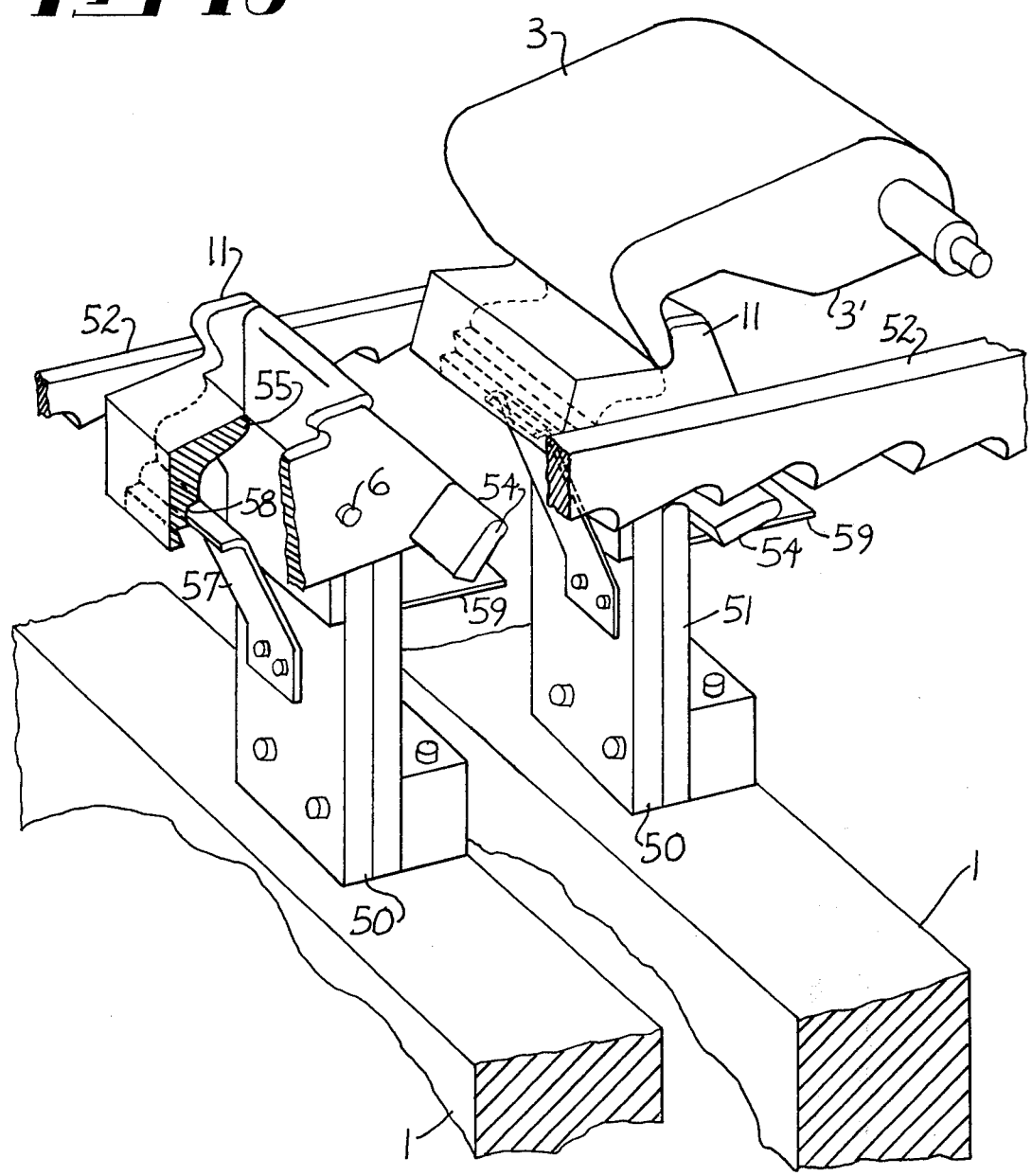
FIG. 10 is a perspective view, partly broken away and in section, showing a further modification of our invention.
Figure 11:
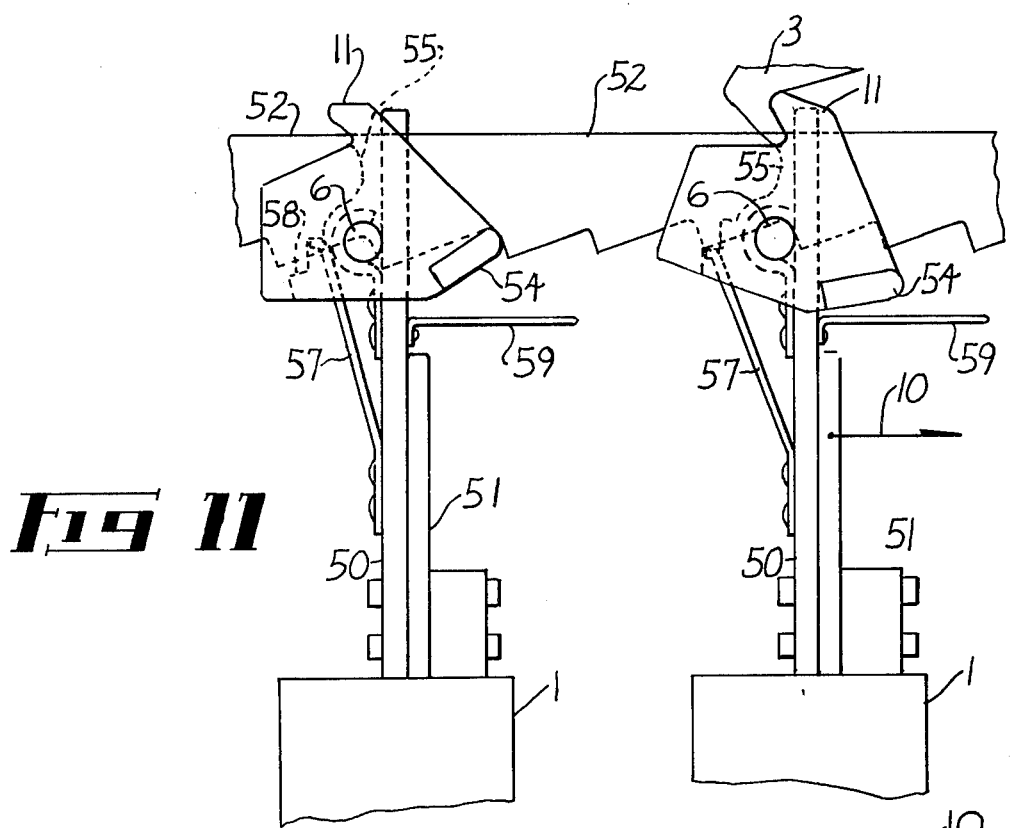
FIG. 11 is a fragmental, side elevational view of the apparatus shown in FIG. 10.
Figure 12:
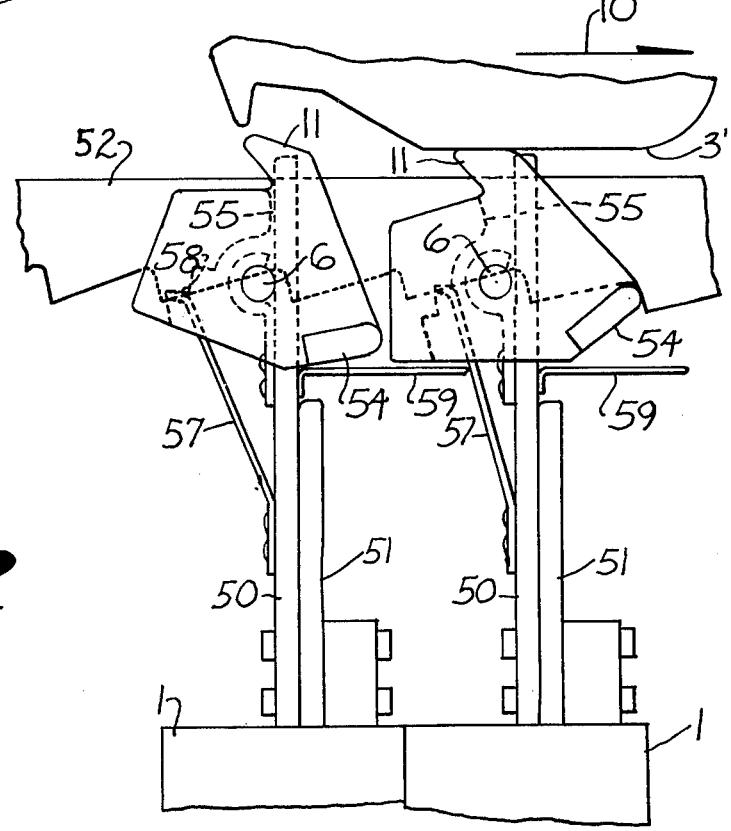
FIG. 12 is a fragmental view corresponding to FIG. 11 showing the apparatus in a different position.

In FIGS. 10, 11 and 12 the upper ends of two filter plates 1 are shown. For transport of the filter plates 1 from closed position to open position a pawl or latch 3 is supported on a pin for pivotal movement about a horizontal axis. The supporting pin for the pawl 3 is pivotally connected to a driven shifting unit such as the unit 2 described hereinabove. The pawl 3 cooperates with a yoke-shaped catch element 11 supported for movement about a horizontal pin 6 which is carried by the upper end of a laminated spring 50. Preferably, spring 50 is combined with one or several additional laminated springs 51 to form a laminated spring package with progressive spring characteristics.

Each of the yoke-shaped catch elements 11 is in addition designed as a locking element, so that every single filter plate can be interlocked in position in a desired operating position on two toothed racks 52 extending above the filter plates 1. To accomplish this, each catch element 11 carries two laterally projecting locking members 54 which are spaced from the pin 6, so that each locking member 54, depending upon the pivotal position of the catch element 11, cooperates with the teeth of the toothed racks 52, or are released therefrom, respectively. The released position, indicated in FIG. 10 at the right filter plate, is reached when a stop 55 on the catch element 11 engages the laminated spring 50. In this position the catch element 11 is further secured by a retaining spring 57 which cooperates with a corresponding retaining cam surface 58 on the inside of the catch element 11. The retaining spring 57 may be mounted on the laminated spring 50 as shown or by other suitable means. Secured to the opposite side of each laminated spring 50 from the side carrying the retaining spring 57 is a forwardly extending release arm 59 which, upon forward movement thereof, cooperates with the retaining spring 57 of the adjacent preceeding filter plate 1 to disengage this retaining spring 57 from its cam surface 58.

The apparatus shown in FIGS. 10, 11 and 12 operates as follows: The pawl 3 has at its bottom side a rejection surface 3′, located forwardly of the hook portion of the pawl 3, as viewed in the direction of travel, which causes the pawl 3 to slide over the catch elements 11 of the filter plates compressed into a package, without effect, whereby it engages only in the catch element carried by the forwardmost filter plate of the package, as shown in FIG. 11. Each catch element 11 is normally located on its supporting pin 6 so as to be maintained by weight distribution on one side of the pin 6 whereby it is always in a pivoted position in which the locking member 54 cooperates with the teeth of the toothed racks 52 to thus interlock the filter plates. When the catch element 11 of the forwardmost filter plate is engaged by the pawl 3, it is rotated thereby at first around its pin 6 in a clockwise direction, as viewed in the drawings, so that its locking member 54 is released from the toothed racks 52. The horizontally effective portion of the shifting force of the pawl 3 is taken up by the resilience of the laminated spring 50 and does not cause undue shock during engagement between the locking member 54 and the toothed racks 52. The pivotal movement of the forwardmost catch element 11 continues until its stop 55 engages the laminated spring 50 and in addition the retaining spring 57 engages the corresponding retaining surface 58, thus interlocking the forwardmost catch element 11 in the position indicated in FIG. 11. Accordingly, through stop 55 the entire shifting force of the forwardmost latch 11 is transferred onto the laminated spring 50 and by this onto the filter plate 1, so that this filter plate is moved along by the pawl 3 in direction of the arrow 10. The resilience of the laminated spring 50 brings about a gradual acceleration of the filter plate being shifted, whereby movement of the filter plate 1 being shifted continues until it approaches a filter plate which is already in the open position.

The catch element 11 of the preceeding filter plate 1 already opened is released through the release arm 59 of the approaching filter plate being shifted, which engages the retaining spring 57 of the preceeding filter plate so that it rotates by gravity to the position shown in FIG. 12, whereby the locking member 54 cooperates with the toothed racks 52. Simultaneously, the rejection surface 3' of the pawl 3 moves onto the catch element 11 of the preceeding filter plate 1, whereby the pawl 3 is rotated upwards and the hook portion thereof is lifted out of the catch element 11 of the subsequent filter plate 1, so that it now comes to rest in the open position. The catch element 11 of the filter plate just shifted remains interlocked by the retaining spring 57 until the pawl 3 moves the next subsequent filter plate forward.

While we have shown our invention in several forms, it will be obvious to those skilled in the art that it is not so limited, but is susceptible of various other changes and modifications without departing from the spirit thereof.

What we claim is:

1. In a pressure filter having filter plates mounted for a horizontal shifting,
   a. a driven shifting unit movable in the direction of shifting,
   b. at least one engaging member carried by said driven shaft unit,
   c. a leaf spring catch member carried by each filter plate and extending upwardly into the path of movement of said engaging member in position to be engaged by said engaging member to transmit accelerative force from said driven shifting unit to said filter plate being shifted and gradually increase the speed at which the filter plate is moved until it reaches the speed of said driven shifting unit,
   d. a movable, leaf spring locking member carried by adjacent filter plates with said catch member cooperating with said locking member and said engaging member to release said locking member, and
   e. a leaf spring stop member limiting movement of said catch member.

2. A pressure filter as defined in claim 1 in which the spring action of the locking member is opposed to the direction of shifting and the locking member is retained in locked position by a retaining element carried by the catch member.

3. A pressure filter as defined in claim 1 in which one end of each catch member and locking member is firmly anchored in place.

4. A pressure filter as defined in claim 3 in which said catch member and said locking member are connected to each other.

5. A pressure filter as defined in claim 1 in which said locking member and said catch member are integral parts of a common leaf spring one end of which is anchored.

6. A pressure filter as defined in claim 1 in which said leaf spring catch member has an aperture therein in position to be engaged by a locking member of an adjacent filter plate.

7. A pressure filter as defined in claim 1 in which said leaf spring catch member has a minor spring tension and the leaf spring stop member has a greater spring tension.

8. A pressure filter as defined in claim 1 in which said leaf springs comprise spring piles with progressive spring action.

9. A pressure filter as defined in claim 1 in which a laminated spring comprising more than one flexible yielding leaf is carried by each filter plate in position to support a catch member for pivotal movement and be engaged by said catch member and a locking member is carried by each catch member.

10. A pressure filter as defined in claim 9 in which said laminated spring is a laminated spring package.

11. A pressure filter as defined in claim 9 in which said catch member carrying said locking member is pivotally mounted adjacent the upper end of said laminated spring with the lower end of said laminated spring being carried by a filter plate.

12. A pressure filter as defined in claim 9 in which the locking member and catch member are retained in the released position by a retaining spring.

13. A pressure filter as defined in claim 12 in which a release arm is mounted in position to engage and release said retaining spring upon movement of adjacent filter plates toward each other.

* * * * *